(12) United States Patent
Chen

(10) Patent No.: US 10,718,466 B2
(45) Date of Patent: Jul. 21, 2020

(54) SUPPORT AND SELFIE STICK WITH SUPPORT

(71) Applicant: SHENZHEN HAOHUALIANHE TECHNOLOGY CO., LTD., Shenzhen, Guangdong (CN)

(72) Inventor: Weihao Chen, Shenzhen (CN)

(73) Assignee: SHENZHEN HAOHUALIANHE TECHNOLOGY CO., LTD., Shenzhen, Guangdong Province (CN)

( * ) Notice: Subject to any disclaimer, the term of this patent is extended or adjusted under 35 U.S.C. 154(b) by 0 days.

(21) Appl. No.: 16/454,216

(22) Filed: Jun. 27, 2019

(65) Prior Publication Data

US 2020/0072411 A1    Mar. 5, 2020

(30) Foreign Application Priority Data

Aug. 28, 2018  (CN) .................... 2018 2 1389849 U

(51) Int. Cl.
*F16M 11/38* (2006.01)
*F16M 13/04* (2006.01)
*F16M 13/06* (2006.01)

(52) U.S. Cl.
CPC ............ *F16M 11/38* (2013.01); *F16M 13/04* (2013.01); *F16M 13/06* (2013.01)

(58) Field of Classification Search
USPC ....................................................... 396/428
See application file for complete search history.

(56) References Cited

U.S. PATENT DOCUMENTS

| 9,298,066 | B1 * | 3/2016 | Fan ...................... G03B 17/561 |
| 2017/0134063 | A1 * | 5/2017 | Lee .......................... H04M 1/04 |
| 2017/0336056 | A1 * | 11/2017 | Fan .......................... F21L 4/005 |
| 2018/0106418 | A1 * | 4/2018 | Anglin ..................... G01S 3/786 |
| 2018/0321573 | A1 * | 11/2018 | Prichard ............ F16M 11/2078 |
| 2019/0047467 | A1 * | 2/2019 | Kim ........................ F16M 11/28 |
| 2019/0072233 | A1 * | 3/2019 | Wang ..................... F16M 11/04 |
| 2019/0163235 | A1 * | 5/2019 | Sherman ............... H04M 1/026 |
| 2019/0327407 | A1 * | 10/2019 | Yu ......................... G03B 17/563 |

* cited by examiner

*Primary Examiner* — Clayton E. LaBalle
*Assistant Examiner* — Warren K Fenwick
(74) *Attorney, Agent, or Firm* — Li & Cai Intellectual Property (USA) Office

(57) ABSTRACT

Disclosed are a support and a selfie stick with a support relating to the field of selfie stick technology. The support includes a seat body on which a receiving slot is provided, a support foot provided on the seat body and rotatable relative to the seat body to extend and support the seat body or to fold to be stored in the receiving slot, and a locking structure provided on the seat body for locking the support foot to support the seat body after the support foot is extended, or for unlocking the support foot to enable the support foot to be stored when the support foot is folded. The support enables the support foot on the support to be stored in the receiving slot after being folded, so that good structural fusion characteristics are provided between the support foot and the seat body.

20 Claims, 10 Drawing Sheets

SUPPORT AND SELFIE STICK WITH SUPPORT

BACKGROUND

1. Technical Field

The invention relates to the technical field of a selfie stick, in particular to a support and a selfie stick with a support.

2. Description of Related Art

With the increasing demand for mobile phone shooting, the selfie stick has emerged as a shooting tool for holding mobile phones. The selfie stick can be arbitrarily stretched over a certain length, and the user only needs to fix the mobile phone on the telescopic rod. The selfie stick allows the user to have a shooting distance which is longer than the arm span when shooting and to easily select various shooting angles. Besides, with the diversification of shooting scenes, there are more and more requirements for the use of the selfie stick. It is no longer limited to handheld use, and sometimes the selfie stick needs to be placed during the use. In this case, the selfie stick needs to be installed independently.

In addition, the existing supports with support feet are large in size and volume, and the support feet are fixed and housed on the outer surface of the seat body, resulting in complicated and disordered structure, and the operation is cumbersome and the user experience is poor.

SUMMARY

In view of the defects and deficiencies of the prior art, the first object of the present invention is to provide a support, wherein the support feet on the support can be stored in the receiving slot after folding, so that the good structural fusion characteristics are provided between the support feet and the seat body. The invention has the advantages of light weight, convenient carrying, compact structure, simple operation, and simple and beautiful appearance after receiving.

In order to achieve the above object, the technical solution adopted by the present invention is: a support comprising: a seat body, on which a receiving slot is provided; a support foot provided on the seat body and rotatable relative to the seat body to extend and support the seat body or to fold to be stored in the receiving slot, and a locking structure provided on the seat body for locking the support foot to support the seat body after the support foot is extended, or for unlocking the support foot to enable the support foot to be stored when the support foot is folded.

A holding structure adapted to the support foot is provided in the receiving slot, and is used for preventing the support foot from detaching from the receiving slot after being stored.

The holding structure comprises: a first block disposed on an inner wall of the receiving slot, and a second block disposed on an inner wall of the receiving slot and symmetrically arranged with the first block for cooperating with the first block to latch the support foot in the receiving slot.

The locking structure is a locking ring and a retaining slot is provided on the seat body, wherein the locking ring comprises: a ring body rotatably mounted in the seat body; a baffle fixedly mounted on the ring body and simultaneously rotatable with the ring body for locking the support foot when the support foot is extended or for unlocking the support foot when the support foot is folded, and a rod, wherein one end of the rod is fixedly assembled with the ring body and the other end of the rod is movably accommodated in the retaining slot for driving the ring body to rotate to drive the baffle to rotate.

A plurality of the baffles are provided at intervals on an outer side wall of the ring body at one side away from the rod; wherein, when the support foot is in an extended state and used to support the seat body, the baffle is rotated with the rod to a preset position and used for abutting against the corresponding support foot to prevent the support foot from rotating from one direction to support the seat body; wherein, when the support foot is folded, the baffle is rotated with the rod and disengages from the support foot to make the support foot to be stored in the receiving slot after the support foot rotates relative to the seat body.

A plurality of support feet are provided, and the baffles are disposed in one-to-one correspondence with the support feet; wherein, when the support foot is not fully extended, the support foot is located between two adjacent baffles to prevent the baffle from rotating, so that the baffles are rotatable only when the plurality of support feet are fully extended.

The locking ring further comprises a sub-baffle disposed on a peripheral portion of the ring body, wherein a predetermined gap is formed between the sub-baffle and the baffle in a vertical direction; wherein, when the plurality of support feet are all in an extended state, the sub-baffle is rotated with the rod to a preset position for abutting against the corresponding support foot to prevent the support foot from rotating in another direction to support the seat body.

After the above technical solution is adopted, the beneficial effects of the present invention are that: according to the support provided by the present invention, a plurality of support feet are hinged to the bottom of the seat body, and the seat body is provided with a receiving slot adapted to the support feet, and the support feet are stored in the corresponding receiving slot after being folded upward, and the plurality of support feet are extended and then locked by the locking structure to support the seat body. Since the support feet are folded upward and are integrally stored in the corresponding receiving slot, the structure has good structural fusion characteristics between the support feet and the seat body, which simplifies the fixing structure of the support feet in the receiving state, so that the support is lighter and portable and makes the outer surface of the seat neat and compact, easy to operate, and improves the user experience.

In view of the defects and deficiencies of the prior art, the second object of the present invention is to provide a selfie stick with a support, and the support feet on the support of the selfie stick can be stored in the receiving slot so that the support feet and the seat are supported. The structure has good structural fusion characteristics, and has the advantages of light weight, convenient carrying, compact structure, simple operation, simple appearance, beautiful appearance and good stability after receiving.

A selfie stick with a support comprises: a clamping portion, a telescopic rod, and the support as mentioned above, wherein the clamping portion is connected to the telescopic rod for clamping a mobile phone, and a cavity is provided on the seat body for enabling the telescopic rod to be folded inside the seat body.

The clamping portion comprises: a first clamping arm, a second clamping arm and a connecting arm; wherein the second clamping arm is elastically stretchable relative to the first clamping arm and forms a clamping space for clamping a mobile phone, and a fill light hinged with the second clamp arm is provided on the second clamping arm, the second clamp arm has two support arms disposed oppositely to each other, and the fill light is provided between the two support arms; wherein one end of the connecting arm is hinged with the first clamping arm, and the other end of the connecting arm is hinged with the telescopic rod A detachable wireless remote controller is provided on an outer surface of the seat body, a sliding slot is provided in the seat body, the wireless remote controller is provided with a sliding rail adapted to the sliding slot, a limiting convex rib is arranged in the sliding slot, and a limiting slot adapted to the limiting convex rib is provided in the sliding rail.

After the above technical solution is adopted, the beneficial effects of the present invention are that: the selfie stick according to the present invention includes a clamping portion and a support according to any of the foregoing aspects, and the clamping portion is connected to the telescopic rod for clamping a mobile phone. Thus, a plurality of support feet can be extended from the seat body during the user of the selfie stick and then the position thereof can be limited through the locking structure, thereby achieving support stability of the selfie stick.

BRIEF DESCRIPTION OF THE DRAWINGS

In order to more clearly illustrate the embodiments of the present invention or the technical solutions in the prior art, the drawings used in the embodiments or the description of the prior art will be briefly described below. Obviously, the drawings in the following description are only certain embodiments of the present invention, and other drawings can be obtained by those skilled in the art without any inventive labor.

FIG. 2 and FIG. 2A are schematic structural views showing an extended state of the selfie stick in the first embodiment, wherein FIG. 2A is an enlarged view of IIA.

DESCRIPTION OF REFERENCE NUMERALS

Figure 1:
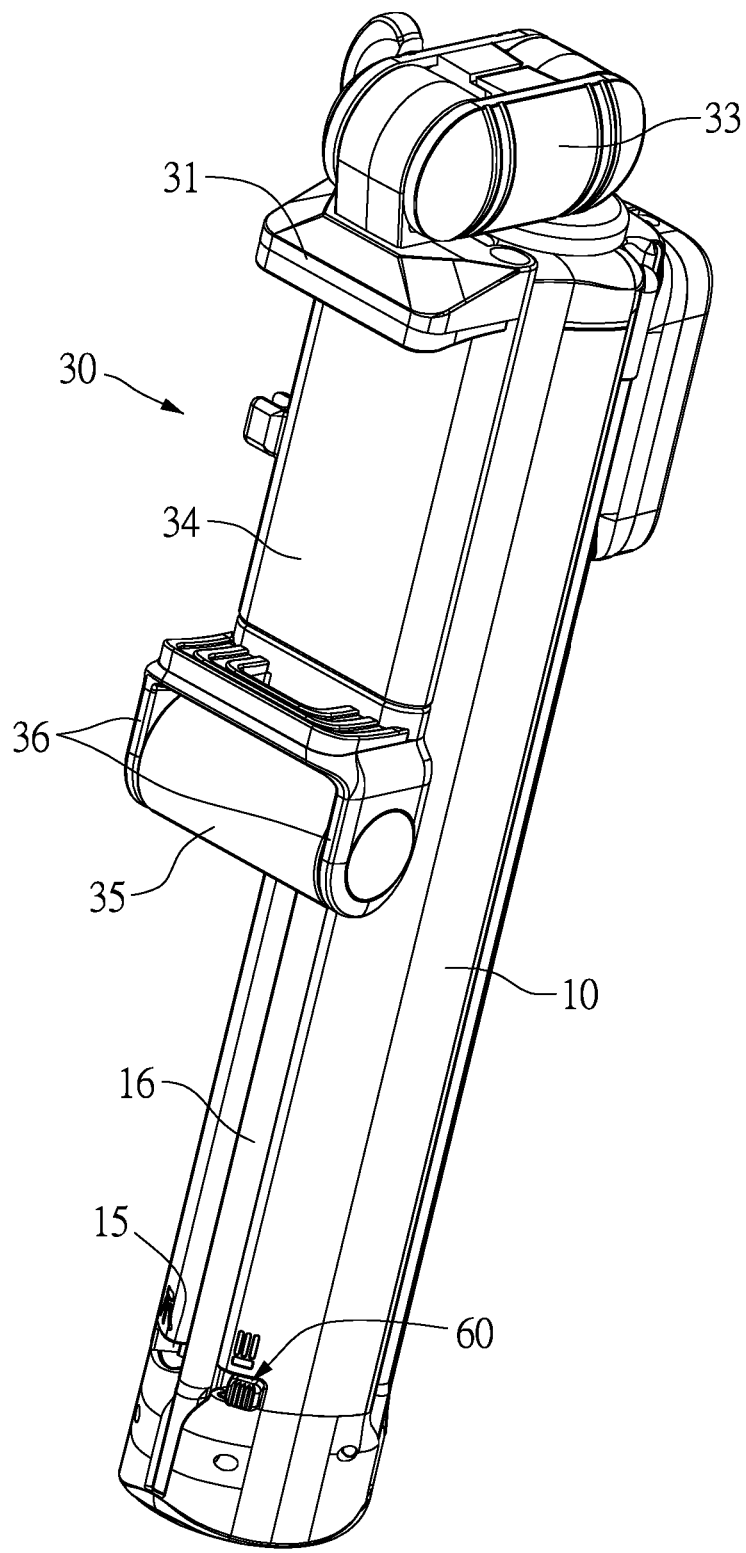
FIG. 1 is a schematic view showing the overall structure of the selfie stick in the first embodiment.
Figures 2, 2A:
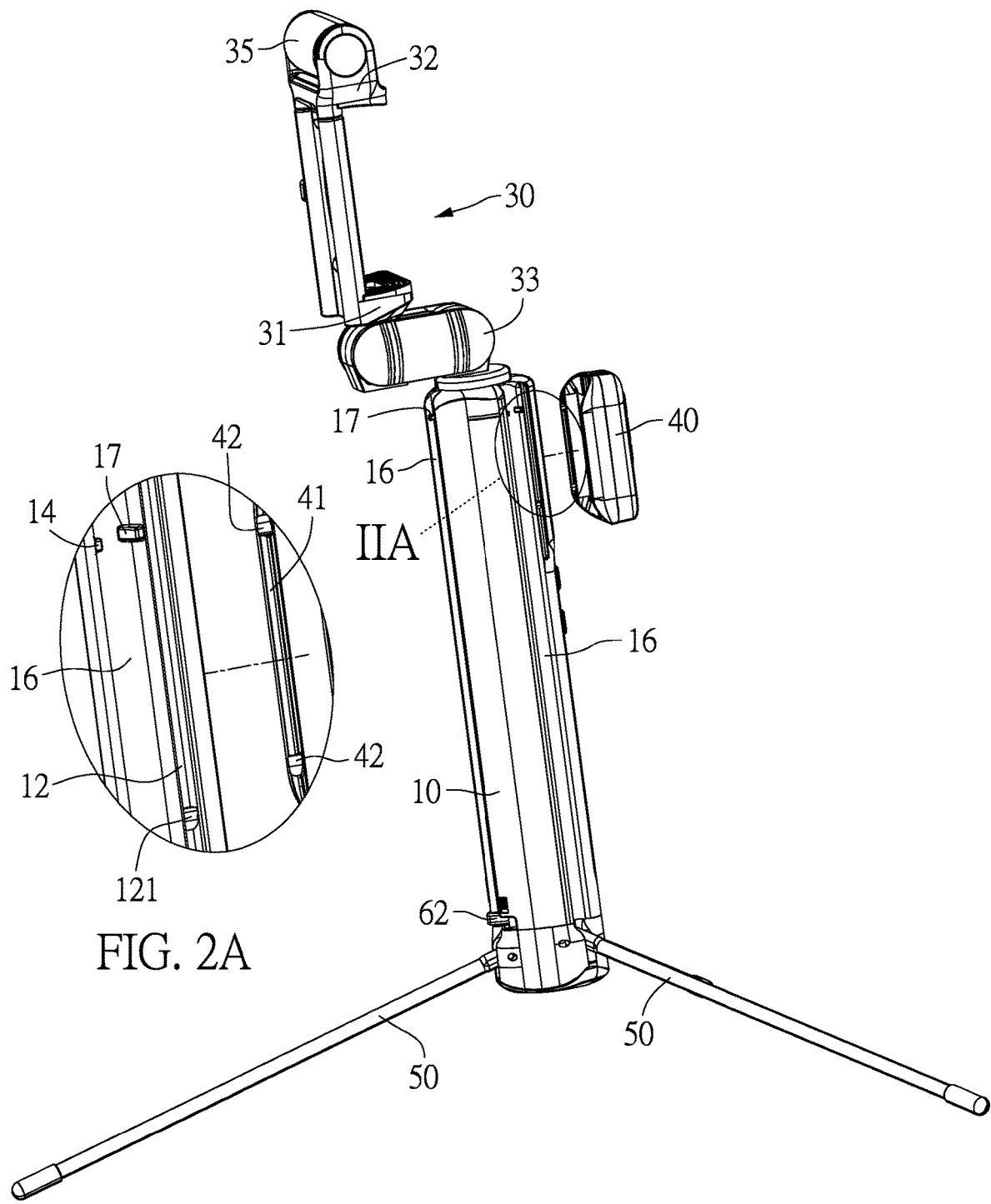
Figure 3:
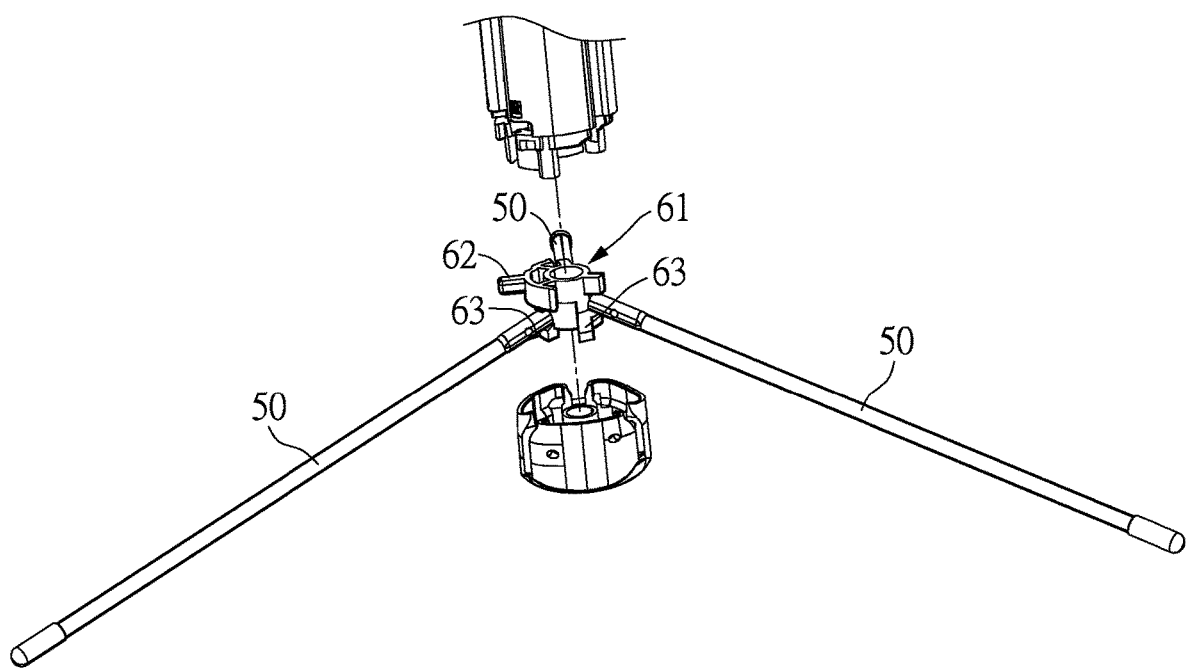
FIG. 3 is a schematic exploded view showing a partial structure of the selfie stick in the first embodiment.
Figure 4:
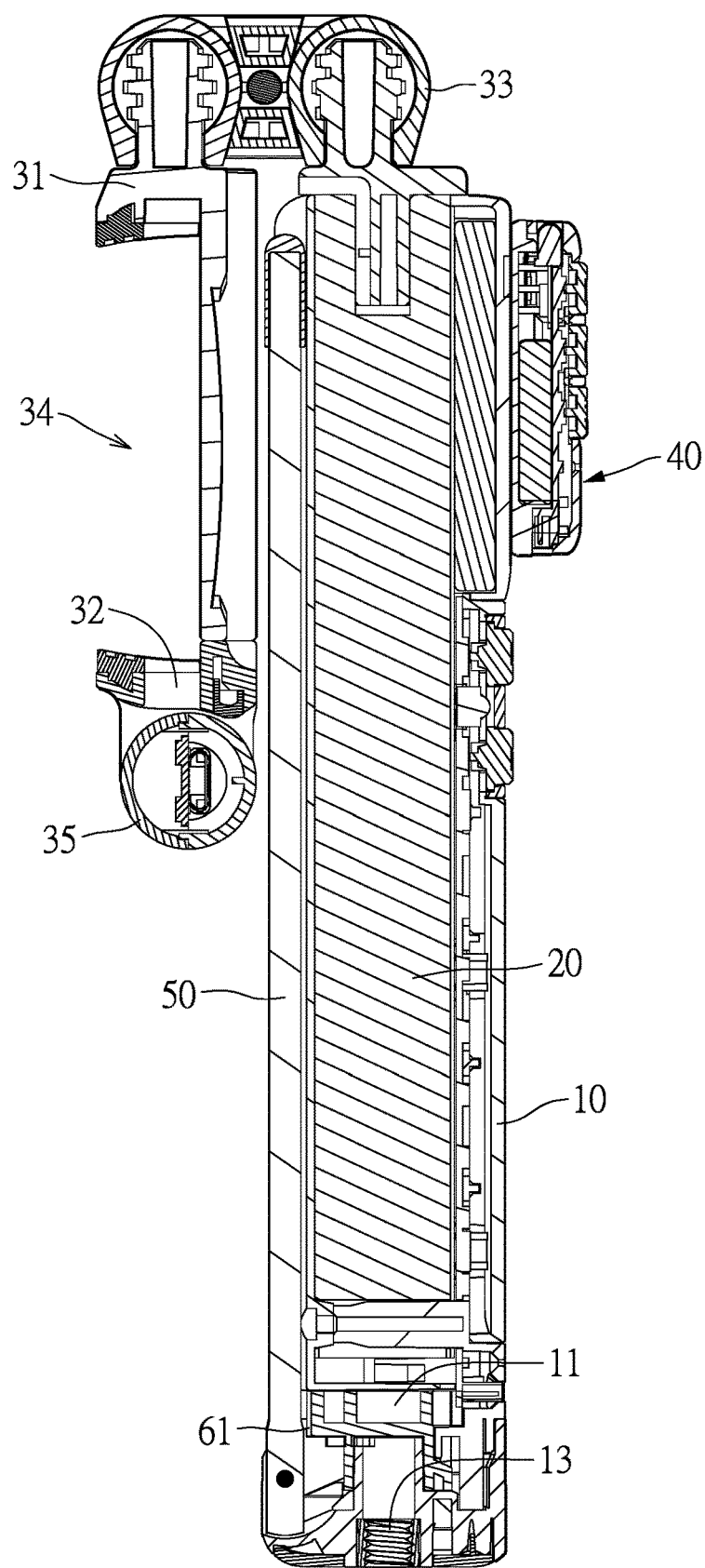
FIG. 4 is a cross-sectional structural view of the selfie stick in the first embodiment.
Figure 5:
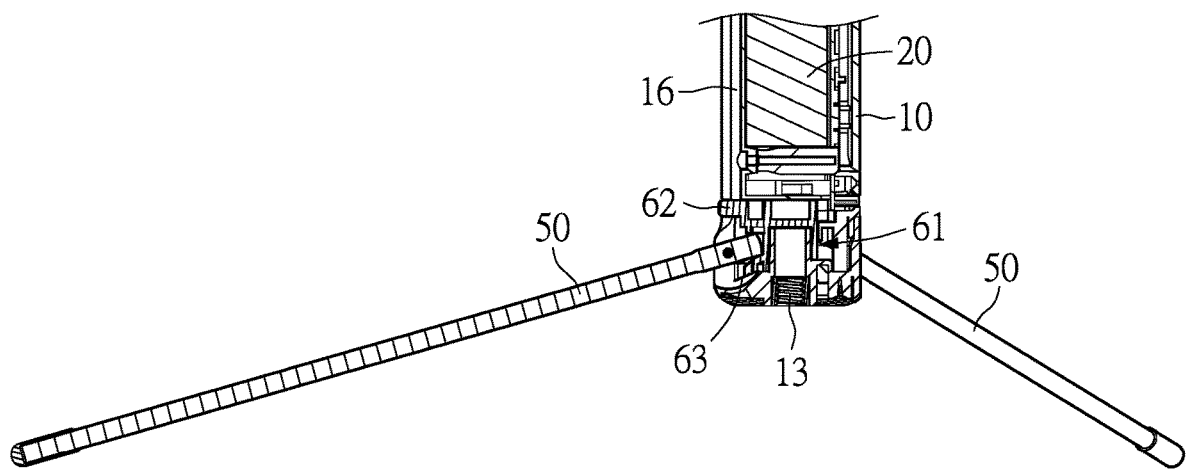
FIG. 5 is a partial cross-sectional view showing an extended state of the selfie stick in the first embodiment.
Figure 6:
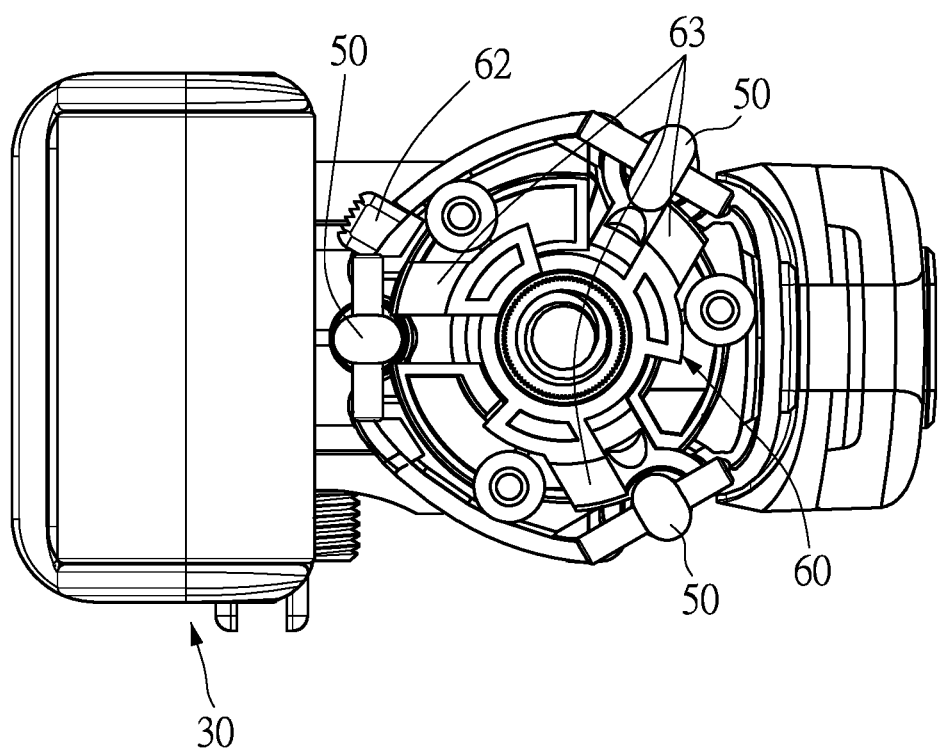
FIG. 6 is a schematic view showing the locking structure of the selfie stick in the first embodiment.
Figure 7:
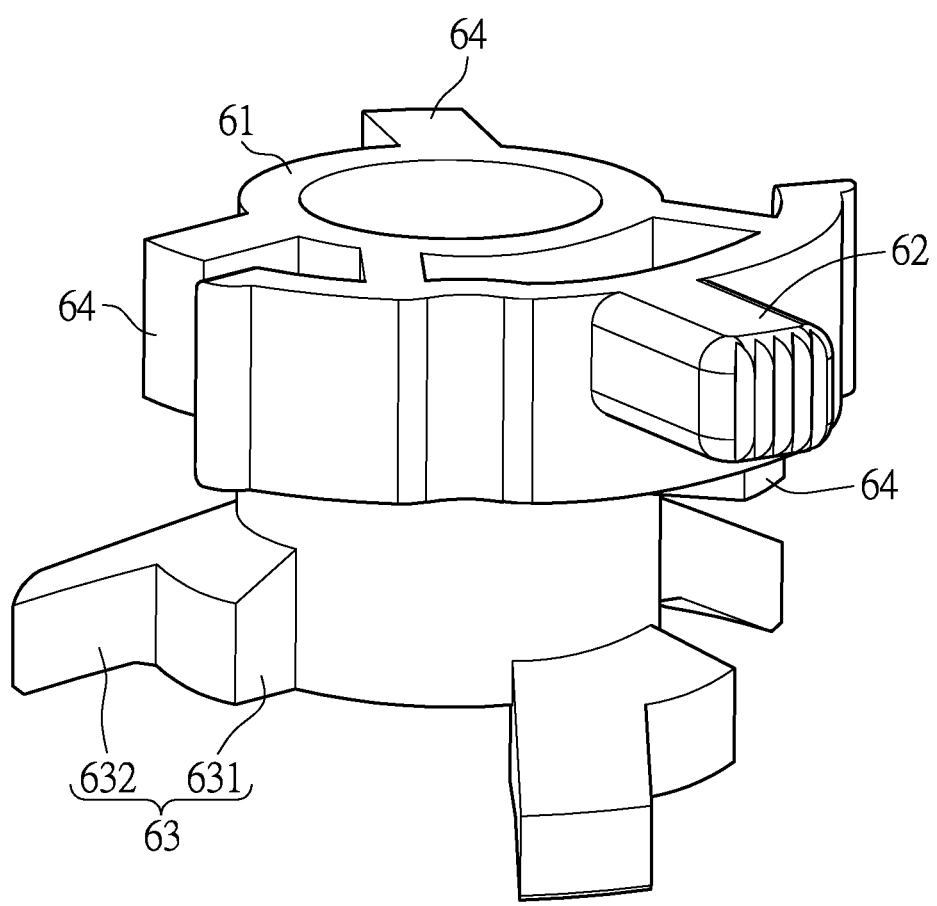
FIG. 7 is a first perspective view of the locking ring of the second embodiment.
Figure 8:
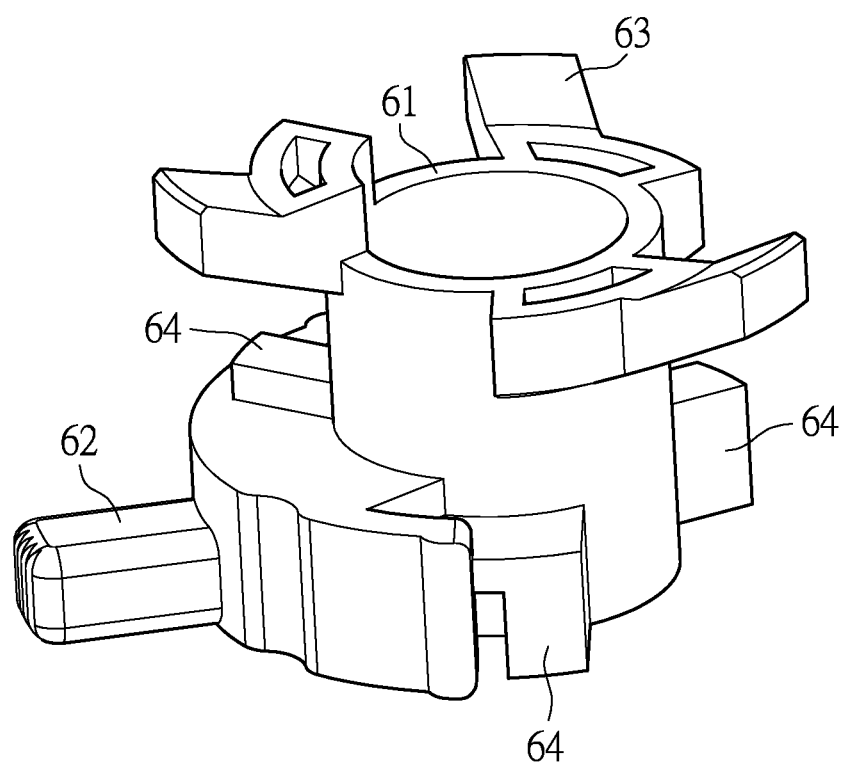
FIG. 8 is a second perspective view of the locking ring of the second embodiment.

10: seat body; 11: cavity; 12: sliding slot; 121: limiting convex rib; 13: threaded hole; 14: first block; 16: receiving slot; 15: retaining slot; 17: second block; 20: telescopic rod; 30: clamping portion; 31: first clamping arm; 32: second clamping arm; 33: connecting arm; 34: clamping space; 35: fill light; 36: support arm; 40: wireless remote control; 41: sliding rail; 42: limiting slot; 50: support feet; 60: locking ring; 61: ring body; 62: rod; 63: baffle; 64: sub-baffle

DESCRIPTION OF THE EXEMPLARY EMBODIMENTS

The invention will be further described in detail below with reference to the accompanying drawings.

The present invention is only an explanation of the present invention, and is not intended to limit the present invention. Those skilled in the art can make modifications that do not contribute to the present embodiment as needed after reading the present specification, but as long as the present invention is in the right of the present invention. All requirements are protected by the patent law.

The first embodiment: this embodiment relates to a selfie stick with a support. As shown in FIG. 1-6, the selfie stick includes a clamping portion 30, a telescopic rod 20 and a support, but it should be noted that in addition to the adaptation to the selfie stick, the support can also be used as a support for other devices such as lights, fans, measuring instruments, and the like.

The clamping portion 30 is connected to the telescopic rod 20 for clamping a mobile phone, and the support comprises a seat body 10, a support foot 50 and a locking structure.

As a preferred clamping portion 30, the clamping portion 30 includes a first clamping arm 31, a second clamping arm 32, and a connecting arm 33. The second clamp arm 32 is elastically stretchable relative to the first clamp arm 31 and forms a clamping space 34 for clamping a mobile phone. The second clamp arm 32 is provided with a fill light 35 hinged to the second clamp arm 32. The second clamp arm 32 has two support arms 36 which are disposed oppositely to each other. The fill light 35 is disposed between the two support arms 36.

Further, the fill light 35 has a cylindrical shape and is rotatable between the support arms 36, thereby adjusting the illumination angle of the fill light 35.

Further, one end of the connecting arm 33 is hinged to the first clamping arm 31, and the other end of the connecting arm 33 is hinged to the telescopic rod 20. The clamping portion 30 can realize a relative rotation of the connecting arm 33 and the seat body 10, thereby facilitating receiving and adjustment of the angle.

The seat body 10 is a cylindrical casing having an open end, and the seat body 10 has a cavity 11 therein for the telescopic rod 20 to be folded. The bottom of the seat body 10 and the main body of the seat body 10 may be an integrated structure, or may be fixedly connected by two separate parts. A control circuit board and a battery are disposed in the seat body 10, and the control circuit board and the battery are permanent components in the selfie stick. The prior art is not the focus of the present application, and details are not described herein.

The outer surface of the seat body 10 is detachably fitted with a wireless remote controller 40. The seat body 10 is provided with a sliding slot 12, and the wireless remote controller 40 is provided with a sliding rail 41 adapted to the sliding slot 12. A limiting convex rib 121 is disposed in the sliding slot 12, and a limiting rail 42 is matched with the limiting convex rib 121. The bottom of the seat body 10 is provided with a threaded hole 13 for fitting with a gimbal or a tripod.

The lower end of the telescopic rod 20 is fixedly mounted in the seat body 10, and the upper end of the telescopic rod 20 is connected to the clamping portion 30. A plurality of support feet 50 are provided and the plurality of support feet 50 are hinged to the bottom of the seat body 10. Preferably, the support feet 50 are provided with three, and the three support feet 50 are hinged to the bottom of the seat body 10, and the three support feet 50 are foldably stored on the seat body 10. As a preferred hinge method, the seat body 10 is provided with a receiving slot 16 adapted to each support foot 50. Each support foot 50 is folded upward and then integrally stored in the receiving slot 16. Specifically, one end of the support foot 50 is hinged to the bottom of the seat body 10, the hinge is disposed in a region of the receiving slot 16 at the bottom of the seat body 10, a hinge shaft perpendicular to the stretching direction of the telescopic rod 20 is formed in the region, and the support foot 50 can be flipped up and down along the hinge axis.

In order to prevent the support foot 50 stored in the receiving slot 16 from detaching from the receiving slot 16 at the time of carrying, the receiving slot 16 is provided with a holding structure for holding the support foot 50 in the receiving slot 16 at all times.

As a preferred holding structure, an elastic rubber portion is provided on the side of the support foot 50 away from the hinge shaft. The holding structure includes a first block 14 and a second block 17. The first block 14 is disposed on the inner wall of the receiving slot 16. The second block 17 is disposed on the inner wall of the receiving slot 16 and symmetrically arranged with the first block 14. The second block 17 is for engaging with the first block 14 so as to engage with the elastic rubber portion on the support foot 50 in the receiving slot 16. That is, after the support foot 50 is engaged in the receiving slot 16, the three support foot 50 is firmly stored in the receiving slot 16 by the provided holding structure.

In this embodiment, the locking structure is disposed at the bottom of the seat body 10, and the three support feet 50 are extended and locked by the locking structure to support the seat body 10.

As a preferred locking structure, the locking structure is a locking ring 60. The locking ring 60 includes a ring body 61, a rod 62 and a plurality of baffles 63 corresponding to the support feet 50. When the number of the support feet 50 is three, the number of the baffles 63 is preferably also three, and each of the baffles 63 corresponds to one support foot 50. The rod 62 and the baffle 63 are fixedly connected to the ring body 61. The ring body 61 is rotatably disposed in the seat body 10. The seat body 10 is provided with a retaining slot 15 for the rotation of the rod 62, and the rod 62 extends out of the seat body 10 from the retaining slot 16, so that the user can rotate the rod 62 from the outside of the seat body 10, and the rotation of the rod 62 drives the baffle 63 to rotate.

In this embodiment, when the plurality of support feet 50 are in an extended state, the baffle 63 is configured to abut against the corresponding support foot 50 from below after rotating with the rod 62 to a preset position, so that the support feet 50 can be prevented from rotating to support the seat body 10. Besides, the baffle 63 is configured to disengage from the support feet 50 after rotating with the rod 62, so that the support feet 50 can be rotated to fold upward.

As a preferred configuration implementation of the baffle 63, the plurality of baffles 63 are spaced apart from the outer periphery of the bottom of the ring body 61 and extend obliquely and downward with respect to the ring body 61 by a predetermined length. When the plurality of support feet 50 are in an extended state, the baffle 63 abuts against the corresponding support foot 50 from below. Since the baffle 63 abuts against the corresponding support foot 50 from below, the support foot 50 cannot be rotated when the plurality of support feet 50 are in an extended state. When the baffle 63 rotates with the rod 62 to the position where it disengages from one end of the support foot 50 (i.e., the baffle 63 no longer abuts against the corresponding support foot 50 from below, and the support foot 50 is located at a gap between adjacent baffles 63), the support foot 50 can be rotated to fold upward.

Preferably, any one of the plurality of support feet 50 which is not in an extended state is located between the two baffles 63 to prevent the baffle 63 from rotating, so that the plurality of support feet 50 are all in an extended state at the same time when being locked. Specifically, at this time, before the three support feet 50 are not completely extended, the support feet 50 which are not extended are located between the two baffles 63, so that the baffles 63 are blocked by the support feet 50 and cannot be rotated.

The working principle of this embodiment is substantially as follows: when the support foot 50 is extended to support the seat body 10, the support foot 50 is driven out of the holding structure by an external force, and is turned down around the hinge axis. After all the support feet 50 are rotated to the desired position, the rod 62 is rotated, so that the rod 62 drives the ring body 61 to rotate, and when the baffle 63 is rotated to the lower side of the corresponding support foot 50 and abuts against the support foot 50, rotation of the rod 62 is stopped, thereby locking the support foot 50 at the current position to ensure that the support foot 50 can provide stable and effective support to the seat body 10. When folding the support foot 50, the rod 62 is driven to return to the original position, and the baffle 63 is again rotated by the ring body 61, so that the baffle 63 is disengaged from the support foot 50 and the locking structure unlocks the support foot 50. Then the support foot 50 is rotated upward by the hinge axis, enabling the support foot 50 to be stored in the receiving slot 16 gradually. After that, the elastic rubber portion on the support foot 50 is engaged with the holding structure to complete the receiving of the support foot 50. The selfie stick adopting the above support has the advantages of light weight, convenient carrying, compact structure, simple operation, simple appearance, beautiful appearance and good stability after receiving.

Figure 9:
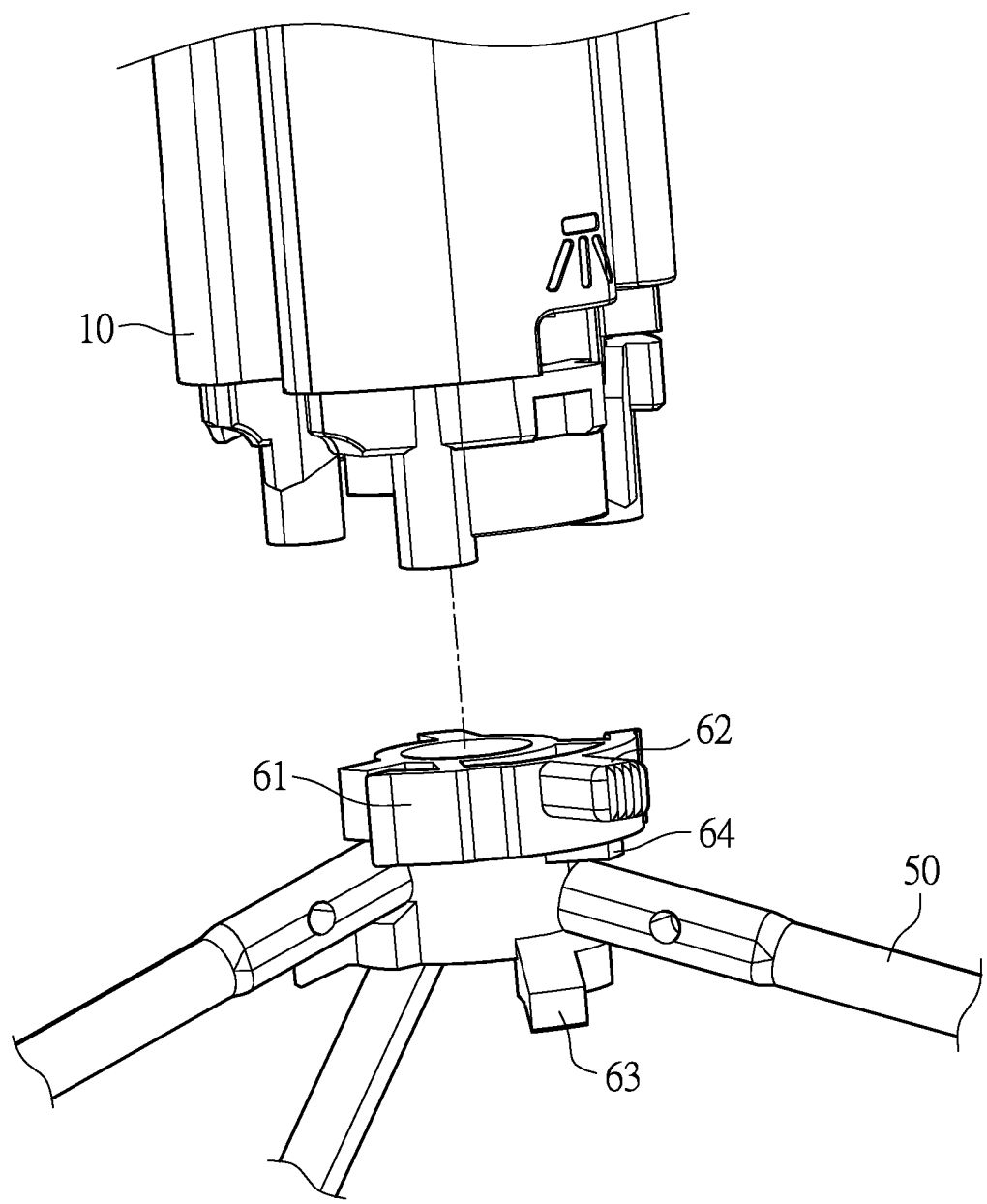
FIG. 9 is a partial exploded view of the support in the second embodiment.
Figure 10:
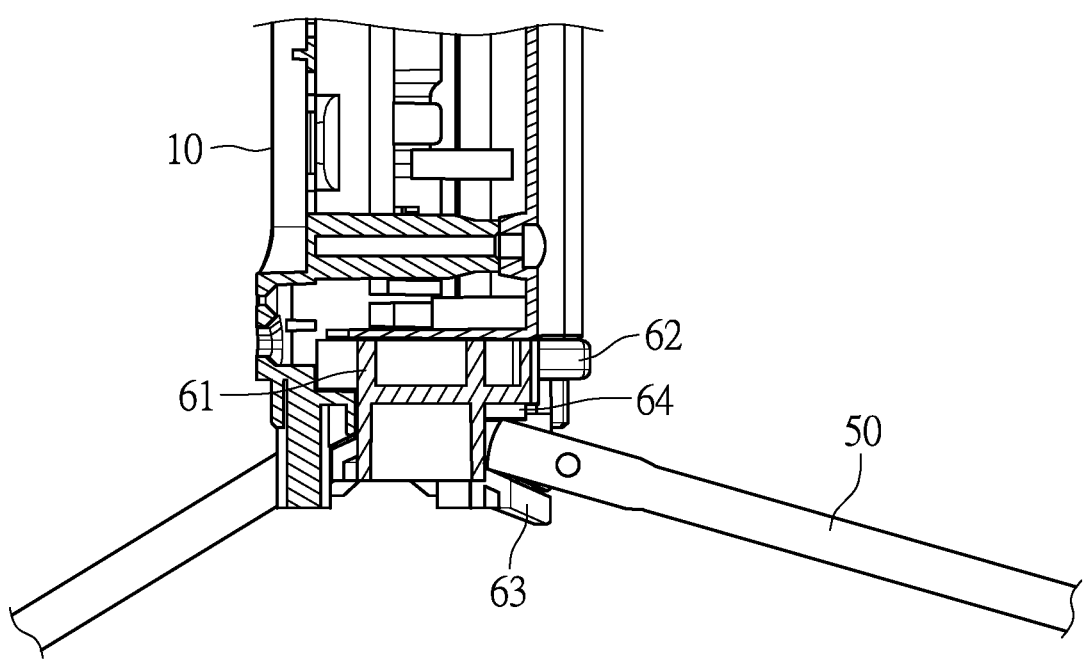
FIG. 10 is a partial cross-sectional view of the support of the second embodiment.

The second embodiment is different from the first embodiment in that, as shown in FIG. 9 and FIG. 10, in the embodiment, the locking ring 60 further includes a sub-baffle 64 disposed on a peripheral portion of the ring body 61, wherein a predetermined gap is formed between the sub-baffle 64 and the baffle 63 in a vertical direction. In a preferred embodiment, the number of the sub-baffles 64 is plural, and the number of the sub-baffles 64 corresponds to the number of the baffles 63. For example, when the number of the baffles 63 is three, the number of the sub-baffles 64 is also three, and each sub-baffle 64 corresponds to one baffle 63. A predetermined gap is formed between each sub-baffle 64 and the corresponding baffle 63 in a vertical direction. In another preferred embodiment, the sub-baffle 64 can also be a structure of full circle surrounding the ring body 61.

Further, as shown in FIGS. 11 and 12, in the support and the selfie stick with the support, the sub-baffle 64 is configured to abut against the corresponding support foot 50 from above when the plurality of support feet 50 are in an extended state to prevent the support foot 50 from rotating to support the seat body 10. That is, when the plurality of support feet 50 are in an extended state, the sub-baffle 64 is located above the corresponding support foot 50, the baffle 63 is located below the corresponding support foot 50, the sub-baffle 64 abuts against the support foot 50 from above, and the baffle 63 abuts against the support foot 50 from below. Since the sub-baffle 64 is provided, the sub-baffle 64 can abut against the support foot 50 to prevent the contact portion of the rod 62 or of the seat body 10 from suffering damage.

Preferably, one or more of the sub-baffles 64 and the baffles 63 are configured with a hard characteristic, and its hard properties are preferably derived from its material properties, for example, made of a metallic material.

The above is only the description of the technical solutions of the present invention, and the other modifications and equivalents of the technical solutions of the present invention should be included in the spirit and scope of the technical solutions of the present invention. Within the scope of the claims of the present invention.

What is claimed is:

1. A support, comprising:
   a seat body (10), on which a receiving slot (16) is provided;
   a support foot (50) provided on the seat body (10) and rotatable relative to the seat body (10), the support foot (50) being configured to be extended to support the seat body (10) or to be folded for being received in the receiving slot (16); and
   a locking structure provided on the seat body (10) for locking the support foot (50) to support the seat body (10) after the support foot (50) is extended, or for unlocking the support foot (50) to enable the support foot (50) to be received when the support foot (50) is folded.

2. The support according to claim 1, wherein a holding structure adapted to the support foot (50) is provided in the receiving slot (16) for preventing the support foot (50) from detaching from the receiving slot (16) after being stored.

3. The support according to claim 2, wherein the holding structure comprises:
   a first block (14) disposed on an inner wall of the receiving slot (16); and
   a second block (17) disposed on the inner wall of the receiving slot (16) and symmetrically arranged with the first block (14) for cooperating with the first block (14) to latch the support foot (50) in the receiving slot (16).

4. The support according to claim 3, wherein the locking structure is a locking ring (60) and a retaining slot (15) is provided on the seat body (10), wherein the locking ring (60) comprises:
   a ring body (61) rotatably mounted in the seat body (10);
   a baffle (63) affixed to the ring body (61) and simultaneously rotatable with the ring body (61) for locking the support foot (50) when the support foot (50) is extended or for unlocking the support foot (50) when the support foot (50) is folded, and
   a rod (62), wherein one end of the rod (62) is fixedly assembled with the ring body (61) and the other end of the rod (62) is movably accommodated in the retaining slot (15) for driving the ring body (61) to rotate to drive the baffle (63) to rotate.

5. The support according to claim 4, wherein a plurality of the baffles (63) are provided at intervals on an outer side wall of the ring body (61) at one side away from the rod (62);
   wherein, when the support foot (50) is in an extended state and used to support the seat body (10), the baffle (63) is rotated with the rod (62) to a preset position and used for abutting against the corresponding support foot (50) to prevent the support foot (50) from rotating from one direction to support the seat body (10);
   wherein, when the support foot (50) is folded, the baffle (63) is rotated with the rod (62) and disengages from the support foot (50) to make the support foot (50) to be stored in the receiving slot (16) after the support foot (50) rotates relative to the seat body (10).

6. The support according to claim 5, wherein a plurality of support feet (50) are provided, and the baffles (63) are disposed in one-to-one correspondence with the support feet (50); wherein, when the support foot (50) is not fully extended, the support foot (50) is located between two adjacent baffles (63) to prevent the baffle (63) from rotating, so that the baffles (63) are rotatable only when the plurality of support feet (50) are fully extended.

7. The support according to claim 6, wherein the locking ring (60) further comprises a sub-baffle (64) disposed on a peripheral portion of the ring body (61), wherein a predetermined gap is formed between the sub-baffle (64) and the baffle (63) in a vertical direction;
   wherein, when the plurality of support feet (50) are all in an extended state, the sub-baffle (64) is rotated with the rod (62) to a preset position for abutting against the corresponding support foot (50) to prevent the support foot (50) from rotating in another direction to support the seat body (10).

8. A selfie stick with a support, comprising:
   a clamping portion (30), a telescopic rod (20); and
   a support,
   wherein the clamping portion (30) is connected to the telescopic rod (20) for clamping a mobile phone, and the support comprises:
   a seat body (10), on which a receiving slot (16) is provided, a cavity (11) provided on the seat body (10) for enabling the telescopic rod (20) to be folded inside the seat body (10);
   a support foot (50) provided on the seat body (10) and rotatable relative to the seat body (10), the support foot (50) being configured to be extended to support the seat body (10) or to be folded for being received in the receiving slot (16); and
   a locking structure provided on the seat body (10) for locking the support foot (50) to support the seat body (10) after the support foot (50) is extended, or for unlocking the support foot (50) to enable the support foot (50) to be received when the support foot (50) is folded.

9. The selfie stick with a support according to claim 8, wherein the clamping portion (30) comprises: a first clamping arm (31), a second clamping arm (32) and a connecting arm (33); wherein the second clamping arm (32) is elastically stretchable relative to the first clamping arm (31) and forms a clamping space (34) for clamping a mobile phone, and a fill light (35) hinged to the second clamp arm (32) is provided on the second clamping arm (32), the second clamp arm (32) has two support arms (36) disposed oppositely to each other, and the fill light (35) is provided between the two support arms (36); wherein one end of the connecting arm (33) is hinged to the first clamping arm (31), and the other end of the connecting arm (33) is hinged to the telescopic rod (20).

10. The selfie stick with a support according to claim 9, wherein a detachable wireless remote controller (40) is provided on an outer surface of the seat body (10), a sliding slot (12) is provided in the seat body (10), the wireless remote controller (40) is provided with a sliding rail (41) adapted to the sliding slot (12), a limiting convex rib (121) is arranged in the sliding slot (12), and a limiting slot (42) adapted to the limiting convex rib (121) is provided in the sliding rail (41).

11. The selfie stick with a support according to claim 8, wherein a holding structure adapted to the support foot (50) is provided in the receiving slot (16) for preventing the support foot (50) from detaching from the receiving slot (16) after being stored.

12. The selfie stick with a support according to claim 11, wherein a holding structure adapted to the support foot (50)

is provided in the receiving slot (16), and is used for preventing the support foot (50) from detaching from the receiving slot (16) after being stored.

13. The selfie stick with a support according to claim 12, wherein a holding structure adapted to the support foot (50) is provided in the receiving slot (16), and is used for preventing the support foot (50) from detaching from the receiving slot (16) after being stored.

14. The selfie stick with a support according to claim 11, wherein the holding structure comprises:
    a first block (14) disposed on an inner wall of the receiving slot (16); and
    a second block (17) disposed on the inner wall of the receiving slot (16) and symmetrically arranged with the first block (14) for cooperating with the first block (14) to latch the support foot (50) in the receiving slot (16).

15. The selfie stick with a support according to claim 14, wherein the locking structure is a locking ring (60) and a retaining slot (15) is provided on the seat body (10), wherein the locking ring (60) comprises:
    a ring body (61) rotatably mounted in the seat body (10);
    a baffle (63) affixed to on the ring body (61) and simultaneously rotatable with the ring body (61) for locking the support foot (50) when the support foot (50) is extended or for unlocking the support foot (50) when the support foot (50) is folded; and
    a rod (62), wherein one end of the rod (62) is fixedly assembled with the ring body (61) and the other end of the rod (62) is movably accommodated in the retaining slot (15) for driving the ring body (61) to rotate to drive the baffle (63) to rotate.

16. The selfie stick with a support according to claim 15, wherein a plurality of the baffles (63) are provided at intervals on an outer side wall of the ring body (61) at one side away from the rod (62);
    wherein, when the support foot (50) is in an extended state and used to support the seat body (10), the baffle (63) is rotated with the rod (62) to a preset position and used for abutting against the corresponding support foot (50) to prevent the support foot (50) from rotating from one direction to support the seat body (10);
    wherein, when the support foot (50) is folded, the baffle (63) is rotated with the rod (62) and disengages from the support foot (50) to make the support foot (50) to be stored in the receiving slot (16) after the support foot (50) rotates relative to the seat body (10).

17. The selfie stick with a support according to claim 16, wherein a plurality of support feet (50) are provided, and the baffles (63) are disposed in one-to-one correspondence with the support feet (50); wherein, when the support foot (50) is not fully extended, the support foot (50) is located between two adjacent baffles (63) to prevent the baffle (63) from rotating, so that the baffles (63) are rotatable only when the plurality of support feet (50) are fully extended.

18. The selfie stick with a support according to claim 17, wherein the locking ring (60) further comprises a sub-baffle (64) disposed on a peripheral portion of the ring body (61), wherein a predetermined gap is formed between the sub-baffle (64) and the baffle (63) in a vertical direction;
    wherein, when the plurality of support feet (50) are all in an extended state, the sub-baffle (64) is rotated with the rod (62) to a preset position for abutting against the corresponding support foot (50) to prevent the support foot (50) from rotating in another direction to support the seat body (10).

19. The selfie stick with a support according to claim 14, wherein the holding structure comprises: a first block (14) disposed on an inner wall of the receiving slot (16), and a second block (17) disposed on an inner wall of the receiving slot (16) and symmetrically arranged with the first block (14) for cooperating with the first block (14) to latch the support foot (50) in the receiving slot (16).

20. The selfie stick with a support according to claim 19, wherein the holding structure comprises: a first block (14) disposed on an inner wall of the receiving slot (16), and a second block (17) disposed on an inner wall of the receiving slot (16) and symmetrically arranged with the first block (14) for cooperating with the first block (14) to latch the support foot (50) in the receiving slot (16).

\* \* \* \* \*